United States Patent
Murai

(10) Patent No.: US 11,128,019 B2
(45) Date of Patent: Sep. 21, 2021

(54) ENERGY STORAGE DEVICE ELECTRODE, ENERGY STORAGE DEVICE, AND METHOD FOR MANUFACTURING ENERGY STORAGE DEVICE ELECTRODE

(71) Applicant: GS Yuasa International Ltd., Kyoto (JP)

(72) Inventor: Tetsuya Murai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 16 days.

(21) Appl. No.: 16/346,710

(22) PCT Filed: Nov. 1, 2017

(86) PCT No.: PCT/JP2017/039465
§ 371 (c)(1),
(2) Date: May 1, 2019

(87) PCT Pub. No.: WO2018/084162
PCT Pub. Date: May 11, 2018

(65) Prior Publication Data
US 2020/0075920 A1    Mar. 5, 2020

(30) Foreign Application Priority Data
Nov. 4, 2016   (JP) .............................. JP2016-216603

(51) Int. Cl.
*H01M 50/00*   (2021.01)
*H01M 50/531*   (2021.01)
*H01G 11/16*   (2013.01)
*H01G 11/26*   (2013.01)
*H01G 11/86*   (2013.01)
*H01G 11/10*   (2013.01)
*H01M 4/02*   (2006.01)

(52) U.S. Cl.
CPC .......... *H01M 50/531* (2021.01); *H01G 11/16* (2013.01); *H01G 11/26* (2013.01); *H01G 11/86* (2013.01); *H01G 11/10* (2013.01); *H01M 2004/028* (2013.01)

(58) Field of Classification Search
CPC .... H01M 2/26; H01M 4/66; H01M 2004/028; H01G 11/10
See application file for complete search history.

(56) References Cited

U.S. PATENT DOCUMENTS

| | | |
|---|---|---|
| 6,335,114 B1 | 1/2002 | Ueshima et al. |
| 2006/0172185 A1 | 8/2006 | Mimura |

(Continued)

FOREIGN PATENT DOCUMENTS

| | | |
|---|---|---|
| EP | 3073552 A1 | 9/2016 |
| JP | H09-134719 A | 5/1997 |

(Continued)

OTHER PUBLICATIONS

International Search Report (ISR) dated Jan. 16, 2018 filed in PCT/JP2017/39465.

*Primary Examiner* — Cynthia H Kelly
*Assistant Examiner* — Monique M Wills
(74) *Attorney, Agent, or Firm* — Rankin, Hill & Clark LLP

(57) ABSTRACT

One aspect of the present invention is directed to an energy storage device electrode including a conductive electrode substrate including a main body and at least one plate-shaped tab and an insulating layer coating a surface and a side surface of a base end of the tab.

14 Claims, 3 Drawing Sheets

(56) References Cited

U.S. PATENT DOCUMENTS

| | | | |
|---|---|---|---|
| 2009/0169986 A1 | 7/2009 | Fukunaga et al. | |
| 2011/0183182 A1 | 7/2011 | Woehrle et al. | |
| 2013/0244116 A1* | 9/2013 | Watanabe | H01M 2/1673 |
| | | | 429/231.8 |
| 2014/0255778 A1 | 9/2014 | Huh et al. | |
| 2015/0125738 A1 | 5/2015 | Hirose | |
| 2016/0099447 A1* | 4/2016 | Takada | H01M 2/0275 |
| | | | 429/179 |
| 2016/0329547 A1 | 11/2016 | Jin et al. | |

FOREIGN PATENT DOCUMENTS

| | | |
|---|---|---|
| JP | H11-026021 A | 1/1999 |
| JP | 2000-348695 A | 12/2000 |
| JP | 2001-093583 A | 4/2001 |
| JP | 2006-236994 A | 9/2006 |
| JP | 2009-146657 A | 7/2009 |
| JP | 2009-163942 A | 7/2009 |
| JP | 2010-009818 A2 | 1/2010 |
| JP | 2010-508631 A | 3/2010 |
| JP | 2011-082039 A | 4/2011 |
| JP | 2012-014935 A | 1/2012 |
| JP | 2013-531872 A | 8/2013 |
| JP | 2013-232374 A | 11/2013 |
| JP | 2014-59971 A | 4/2014 |
| JP | 2014-137944 A | 7/2014 |
| JP | 2015-517189 A | 6/2015 |
| JP | 2015-146237 A | 8/2015 |
| JP | 2016-40755 A | 3/2016 |
| JP | 2017-188371 A | 10/2017 |
| WO | 2017174374 A1 | 10/2017 |

* cited by examiner

ENERGY STORAGE DEVICE ELECTRODE, ENERGY STORAGE DEVICE, AND METHOD FOR MANUFACTURING ENERGY STORAGE DEVICE ELECTRODE

TECHNICAL FIELD

The present invention relates to an energy storage device electrode, an energy storage device, and a method for manufacturing the energy storage device electrode.

BACKGROUND ART

A nonaqueous electrolyte secondary battery typified by a lithium ion secondary battery is widely used for electronic devices such as a personal computer and a communication terminal, automobiles, and the like because of high energy density of the nonaqueous electrolyte secondary battery. The nonaqueous electrolyte secondary battery typically includes a pair of electrodes constructed with sheet-shaped positive and negative electrodes and a nonaqueous electrolyte interposed between the electrodes, and transfers ions between the two electrodes to perform charge and discharge. Capacitors such as a lithium ion capacitor and an electric double layer capacitor are also widely used as an energy storage device except for the nonaqueous electrolyte secondary battery.

The pair of electrodes usually forms an electrode assembly alternately laminated or wound with a separator interposed therebetween. Some of the electrodes are provided with a tab that collects current. In this tabbed electrode, each tab is provided such that a plurality of tabs of the positive electrode and a plurality of tabs of the negative electrode overlap each other in the state of forming the electrode assembly having the above structure. In the electrode assembly, deviation may be generated in a laminated state of the electrode and the separator due to unexpected vibration or external force. When the unexpected deviation is generated, a short circuit may be generated due to contact of one of the electrodes with the tab of the other electrode. An electrode in which an insulating layer is provided on a surface of the tab has been developed in order to prevent the generation of the short circuit (see Patent Document 1).

PRIOR ART DOCUMENT

Patent Document

Patent Document 1: JP-A-2015-517189

SUMMARY OF THE INVENTION

Problems to be Solved by the Invention

However, an electrode mixture layer and the insulating layer are formed on a surface of a substrate by coating, and the substrate is cut into the shape of the tabbed electrode, thereby manufacturing the tabbed electrode provided with the insulating layer. For this reason, the conductive substrate is exposed on a side surface of the tab. In design of the energy storage device, a problem is not generated during normal use. However, in the case that the energy storage device is exposed to an unexpected abnormal situation, in the conventional tabbed electrode, there is a concern that one of the electrodes comes into electrical contact with the side surface of the tab of the other electrode to reduce performance of the energy storage device. In particular, as described above, the plurality of tabs are laminated for each tab of each electrode in the electrode assembly. For this reason, although front and back surfaces of the tab in the laminated state is protected by the other adjacent tabs, the tab protrudes from a main body of the electrode assembly while the substrate is exposed on the side surface of the tab. Thus, in the case that the unexpected deviation is generated in one of the positive electrode and the negative electrode, there is a concern that the deviated electrode comes into electrical contact with the side surface of the tab of the other electrode protruding from the main body of the electrode assembly.

The present invention has been made based on the circumstances as described above, and an object of the present invention is to provide an energy storage device electrode that can prevent the electrical contact between the tab of one of the electrodes and the other electrode due to the generation of the unexpected lamination deviation or the like, an energy storage device including the energy storage device electrode, and a method for manufacturing the energy storage device electrode.

Means for Solving the Problems

One aspect of the present invention made to solve the above problems is directed to an energy storage device electrode including a conductive electrode substrate including a main body and at least one plate-shaped tab and an insulating layer coating a surface and a side surface of a base end of the tab.

Another aspect of the present invention is directed to an energy storage device including the energy storage device electrode.

Still another aspect of the present invention is directed to a method for manufacturing an energy storage device electrode, the method including: preparing a conductive electrode substrate including a main body and at least one plate-shaped tab; and forming an insulating layer coating a surface and a side surface of a base end of the tab.

Advantages of the Invention

The present invention can provide the energy storage device electrode that can prevent the electrical contact between the tab of one of the electrodes and the other electrode due to the generation of the unexpected lamination deviation or the like, the energy storage device including the energy storage device electrode, and the method for manufacturing the energy storage device electrode.

MODE FOR CARRYING OUT THE INVENTION

Figure 1:
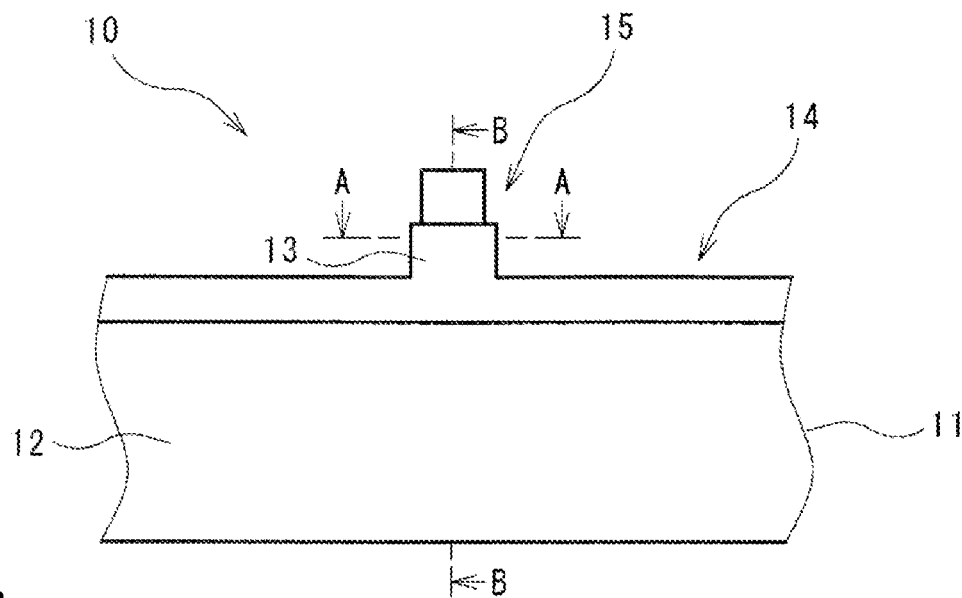
FIG. 1 is a plan view illustrating an energy storage device electrode according to an embodiment of the present invention.

An energy storage device electrode according to an embodiment of the present invention is an energy storage device electrode (hereinafter, also simply referred to as an "electrode") including a conductive electrode substrate including a main body and at least one plate-shaped tab and an insulating layer that coats a surface and a side surface of a base end of the tab.

In the electrode, the side surface of the tab is also coated with the insulating layer, so that electrical contact is hardly generated even if another electrode contacts with the side surface of the tab. Thus, the electrical contact between the tab of one of the electrodes and the other electrode due to the generation of unexpected lamination deviation and the like can be prevented in the electrode.

Preferably an average thickness of the insulating layer coating the side surface of the tab is larger than an average thickness of the insulating layer coating the surface of the tab. As described above, by forming a thick insulating layer on the side surface with which the electrode easily contacts, a short circuit due to a conductive burr that is possibly generated during slitting of a current collector in forming the tab can be prevented, and the electrical contact of the other electrode with the side surface of the tab can reliably be prevented. In the case that the insulating layer is formed by dry coating or the like, the average thickness of the insulating layer coating the surface of the tab has a correlation with the average thickness of the insulating layer coating the side surface of the tab. For this reason, in observing a shape of the tab in order to inspect winding misalignment or the burr, the thickness of the insulating layer coating the surface of the tab can be managed by measuring the average thickness of the relatively-thick, easily-measured insulating layer coating the side surface of the tab.

Preferably the insulating layer contains an insulating particle and a binder. Consequently, the insulating layer having good insulation can efficiently be formed.

Preferably the electrode includes the electrode mixture layer laminated on the surface of the main body, and the average thickness of the insulating layer coating the surface of the tab is less than or equal to an average height from the surface of the main body to the surface of the electrode mixture layer. Consequently, in the electrode assembly having the laminated or wound structure, a portion in which the tab is laminated can be prevented from being thickened, and the energy storage device can be miniaturized.

Preferably the electrode is the positive electrode. For example, when a metallic foreign matter adheres to the positive electrode during use, the metallic foreign matter dissolves out in the electrolyte and precipitates on the negative electrode, which sometimes causes the electrical contact that leads to a decrease in electrochemical performance of the energy storage device. The decrease in performance of the energy storage device due to the metallic foreign matter can be prevented using the electrode provided with the insulating layer as the positive electrode.

An energy storage device according to an embodiment of the present invention is an energy storage device including the electrode. The energy storage device includes the electrode in which the insulating layer is provided on the surface and the side surface of the tab, so that the electrical contact between the tab of one of the electrodes and the other electrode can be prevented.

A method for manufacturing an energy storage device electrode according to an embodiment of the present invention is a method for manufacturing the energy storage device electrode, the method including: preparing a conductive electrode substrate including a main body and at least one plate-shaped tab; and forming an insulating layer coating a surface and a side surface of a base end of the tab. The method can obtain the electrode that can prevent the electrical contact between the tab of one of the electrodes and the other electrode due to the generation of the unexpected lamination deviation and the like.

Preferably the insulating layer is formed by dry coating. When the insulating layer is formed by the dry coating, the insulating layer formed on the side surface of the tab can relatively easily be thickened, and the electrode that can reliably prevent the electrical contact in physical contact of the other electrode with the side surface of the tab can efficiently be manufactured. In the dry coating, a coating amount is easily controlled as compared with wet coating, and a highly uniform insulating layer can be formed.

The electrode of the embodiment of the present invention, the method for manufacturing the same, and the energy storage device will be described in detail below.

<Energy Storage Device Electrode>

Figure 2:
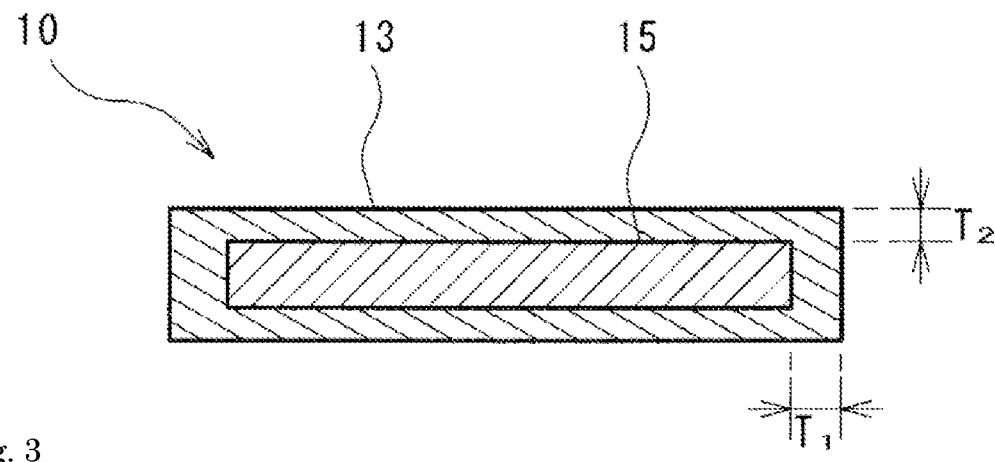
FIG. 2 is a sectional view of the energy storage device electrode in FIG. 1 taken along line A-A.
Figure 3:
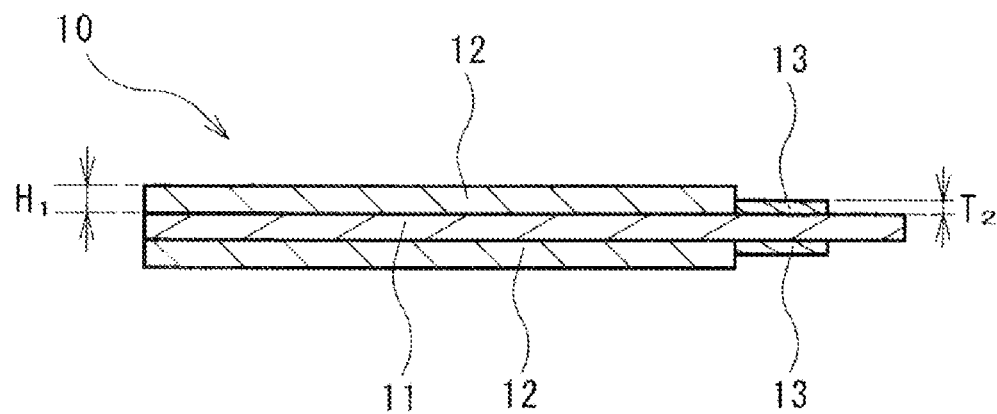
FIG. 3 is a sectional view of the energy storage device electrode in FIG. 1 taken along line B-B.

An electrode 10 (energy storage device electrode) in FIGS. 1 to 3 includes an electrode substrate 11, an electrode mixture layer 12, and an insulating layer 13 (in particular, see FIG. 3). The electrode substrate 11 includes a main body 14 and a tab 15 (in particular, see FIG. 1). The electrode mixture layer 12 is laminated on the front and back surfaces of the main body 14 while an edge on a side of the tab 15 (electrode mixture layer non-forming portion) is left, and the insulating layer 13 is laminated on the electrode mixture layer non-forming portion of the main body 14 and the base end of the tab 15.

The electrode substrate 11 has conductivity. As used herein, the term "having conductivity" means that volume resistivity measured in accordance with JIS-H-0505 (1975) is less than or equal to $10^7$ Ω·cm. The electrode substrate 11 has a sheet shape.

In the case that the electrode 10 is the positive electrode, metals such as aluminum, titanium, and tantalum or alloys thereof are used as a material of the electrode substrate 11 (positive-electrode substrate). Among others, aluminum and an aluminum alloy are preferable from the viewpoint of a balance among potential resistance, high conductivity, and cost. That is, preferably an aluminum foil is used as the positive-electrode substrate. A1085P and A3003P defined in JIS-H-4000 (2014) can be cited as an example of aluminum or the aluminum alloy. On the other hand, when the electrode 10 is the negative electrode, metals such as copper, nickel, stainless steel, and nickel plating steel or alloys thereof are used as a material of electrode substrate 11 (negative-electrode substrate), and copper or a copper alloy is preferably used. That is, preferably a copper foil is used as the negative-electrode substrate. A rolled copper foil and an electrolytic copper foil can be cited as an example of the copper foil.

The main body 14 has a square shape or a belt shape in planar view. An electrode mixture layer forming portion in which the electrode mixture layer 12 is laminated and the electrode mixture layer non-forming portion in which the electrode mixture layer 12 is not laminated exist on both main surfaces (front and back surfaces) of the main body 14.

The electrode mixture layer non-forming portion in the main body 14 is a belt-shaped region along an end face on the side on which the tab 15 is connected.

The tab 15 is formed so as to be connected to the end face on a long side (electrode mixture layer non-forming portion side) of the main body 14. The tab 15 has a plate shape. As used herein, the term "plate shape" means a shape in which the side surface connecting the main surfaces exists other than the pair of main surfaces (front and back surfaces). Although only one tab 15 is illustrated in FIG. 1, a plurality of tabs 15 may be provided for one main body 14, or only one tab 15 may be provided for one main body 14. In the case of obtaining the electrode assembly having a structure in which a plurality of positive electrodes and a plurality of negative electrodes are alternately laminated with a separator interposed therebetween, usually one electrode substrate 11 includes one tab 15. On the other hand, in the case of obtaining the electrode assembly having a structure in which the positive electrode, the negative electrode, and the separator are wound, usually one electrode substrate 11 includes a plurality of tabs 15.

The shape of the tab 15 in planar view is not particularly limited, but usually has a substantially square shape. The term "substantially square shape" is a concept including a square with rounded corners, a square with curved sides, and the like. A leading end side of the tab 15 may be a semicircular shape or the like.

The main body 14 and the tab 15 have substantially the same thickness, and form the continuous front and back surfaces. The electrode substrate 11 including the main body 14 and the tab 15 may be obtained by cutting one sheet-shaped conductive material of a metal foil such as an aluminum foil and a copper foil. Alternatively, the electrode substrate 11 may be formed by bonding the separate main body 14 and tab 15.

For example, the average thickness of the electrode substrate 11 ranges from 5 μm to 30 μm, both inclusive. The term "average thickness" means an average value of the thickness measured at any ten points. The same holds true for the case that the "average thickness" is referred to for other members and the like.

The electrode mixture layer 12 is laminated in a region except for the electrode mixture layer non-forming portion on the front and back surfaces of the main body 14 of the electrode substrate 11. The electrode mixture layer 12 contains an active material and, as necessary, optional components such as a conductive agent, a binder (binding agent), a thickener, and a filler. A publicly known component used for a general electrode mixture layer can be used as each of the components.

Examples of the active materials (positive active material) in the case that the electrode 10 is the positive electrode include composite oxides ($Li_xCoO_2$, $Li_xNiO_2$, $Li_xMnO_3$, $Li_xNi_\alpha Co_{(1-\alpha)}O_2$, $Li_xNi_\alpha Mn_\beta Co_{(1-\alpha-\beta)}O_2$, $Li_{1+w}Ni_\alpha Mn_\beta Co_{(1-\alpha-\beta-w)}O_2$, and the like having a layered α-$NaFeO_2$ type crystal structure and $Li_xMn_2O_4$, $Li_xNi_\alpha Mn_{(2-\alpha)}O_4$, and the like having a spinel type crystal structure) represented by $Li_xMO_y$ (M represents at least one kind of transition metal) and polyanion compounds ($LiFePO_4$, $LiMnPO_4$, $LiNiPO_4$, $LiCoPO_4$, $Li_3V_2(PO_4)_3$, $Li_2MnSiO_4$, $Li_2CoPO_4F$, and the like) represented by $Li_wMe_x(AO_y)_z$ (Me represents at least one kind of transition metal and A represents P, Si, B, V, and the like). The elements or polyanions in these compounds may partially be substituted with other elements or anion species. In the electrode mixture layer, one kind of these compounds may be used alone, or at least two kinds of these compounds may be mixed and used.

Examples of the active materials (negative active material) in the case that the electrode 10 is the negative electrode include metals or semimetals such as Si and Sn, metal oxides or semimetal oxides such as Si oxide and Sn oxide, polyphosphoric acid compounds, and carbon materials such as graphite (graphite) and amorphous carbon (easily graphitizable carbon or non-graphitizable carbon).

For example, the average thickness of the electrode mixture layer 12 ranges from 1 μm to and 100 μm, both inclusive, per side.

The insulating layer 13 is a layer coating the electrode mixture layer non-forming portion of the main body 14 and the base end of the tab 15. The term "insulation" in the insulating layer 13 means that the conductivity of the insulating layer 13 is lower than that of the electrode substrate 11. Specifically, a surface resistance value A is measured by pressing two probes of a resistivity meter ("Loresta-EPMCP-T360" manufactured by Mitsubishi Chemical Analytech Co., Ltd.) against places where the insulating layer is formed. Similarly, a surface resistance value B is measured in the place of the tab where the insulating layer is not formed. When the value of A is increased at least 50 times the value of B, it is determined that the insulating layer has the insulation.

The insulating layer 13 coats the front surface, the back surface, and the pair of side surfaces at the base end of the tab 15. That is, the whole surface of the base end of the tab 15 is coated with the insulating layer, and the electrode substrate 11 is not exposed. Consequently, the electrical contact between the tab of one of the electrodes and the other electrode can more reliably be prevented. As used herein, the term "base end" of the tab 15 means a portion connected to the main body 14 in the tab 15.

The insulating layer 13 may also coat the end face of the electrode mixture layer non-forming portion, namely, the end face on the side of the tab 15 of the main body 14. Preferably the end face in the electrode mixture layer non-forming portion is coated with the insulating layer 13 because safety of the energy storage device is improved. The insulating layer 13 may coat a part of the electrode mixture layer 12.

In the tab 15, a side opposite to the base end is the leading end. The insulating layer 13 is not laminated at the leading end, and the tab 15 (electrode substrate 11) is exposed. As described later, the leading end of the tab 15 is a place to which a conductive connecting member (also referred to as a current collecting member) is connected while the electrode assembly is formed.

A lower limit of a length of the region where the insulating layer 13 is laminated in the tab 15 is preferably 10% of a length of the tab 15, and more preferably 20%. The electrical contact prevention function can further be enhanced by setting the length of the insulating layer lamination region in the tab 15 to the lower limit or more. An upper limit of the length of the region where the insulating layer 13 is laminated is preferably 70% of the length of the tab 15, and more preferably 50%. The connection region with the connecting member can sufficiently be secured by setting the length of the insulating layer lamination region in the tab 15 to the upper limit or less. The length of the region where the insulating layer 13 is laminated in the tab 15 means a length in a protrusion direction of the tab 15 based on the end side on the base end side connected to the main body 14 (a vertical length in FIG. 1).

Preferably an average thickness ($T_1$) of the insulating layer 13 coating the side surface of the tab 15 is larger than an average thickness ($T_2$) of the insulating layer 13 coating the surface of the tab 15 (see FIG. 2). The side surface of the tab 15 has a rougher surface and lower smoothness than the front and back surfaces of the tab 15, so that the electrical contact between the other electrode and the side surface of the tab 15 can further be prevented by setting the average thickness of the insulating layer 13 to $T_1 > T_2$. For example, preferably the average thickness ($T_1$) ranges from more than 1 time to less than or equal to 3 times of the average thickness ($T_2$).

The lower limit of the average thickness ($T_1$) of the insulating layer 13 coating the side surface of the tab 15 may be 1 μm, preferably 3 μm, and more preferably 7 μm. In the case that the other electrode contacts with the side surface of the tab 15, the electrical contact prevention function can be enhanced by setting the average thickness ($T_1$) of the insulating layer 13 on the side surface to the lower limit or more. On the other hand, the upper limit of the average thickness ($T_1$) may be set to, for example, 100 μm, or may be 30 μm or 20 μm.

The lower limit of the average thickness ($T_2$) of the insulating layer 13 coating the surface of the tab 15 may be 1 μm, preferably 3 μm, and more preferably 7 μm. The sufficient electrical contact prevention function can be exhibited by setting the average thickness ($T_1$) of the insulating layer 13 on the surface to the lower limit or more. On the other hand, the upper limit of the average thickness ($T_2$) may be set to, for example, 100 μm, or may be 30 μm or 20 μm.

Preferably the average thickness ($T_2$) of the insulating layer 13 coating the surface of the tab 15 is less than or equal to an average height ($H_1$) from the surface of the main body 14 (electrode substrate 11) to the surface of the electrode mixture layer 12 (see FIG. 3). The term "average height" means an average value of the height measured at any ten points. In the electrode 10 of FIG. 3, the average height ($H_1$) is equal to the average thickness of the electrode mixture layer 12.

Preferably the insulating layer 13 contains an insulating particle and a binder. The insulating layer 13 may contain other components except for the insulating particle and the binder.

The insulating particle may be either an inorganic particle or an organic particle, and the inorganic particle is preferably used from the viewpoint of heat resistance and the like. Examples of the inorganic particles include inorganic oxides such as silica, alumina, titania, zirconia, magnesia, ceria, yttria, zinc oxide and iron oxide, inorganic nitrides such as silicon nitride, titanium nitride and boron nitride, and silicon carbide, calcium carbonate, aluminum sulfate, aluminum hydroxide, potassium titanate, talc, kaolin clay, kaolinite, boehmite, halloysite, pyrophyllite, montmorillonite, sericite, mica, amesite, bentonite, asbestos, aluminosilicate, calcium silicate, magnesium silicate, diatom earth, silica sand, and glass. Among those, inorganic oxides are preferable, and alumina is more preferable.

A binder that can fix the insulating particle and is electrochemically stable in a use range is usually used as the above binder. Examples of the binder include fluororesins such as polytetrafluoroethylene (PTFE) and polyvinylidene fluoride (PVDF), thermoplastic resins such as polyethylene, polypropylene, and polyimide, elastomers such as ethylene-propylene-diene rubber (EPDM), sulfonated EPDM, styrene butadiene rubber (SBR), and fluororubber, and polysaccharide polymers. Among those, from the viewpoint of heat resistance and the like, fluororesins are preferably used, and PVDF is more preferably used.

Although the electrode 10 can be used as both the positive electrode and the negative electrode, the electrode 10 is preferably used as the positive electrode. The electrode 10 can also be used as both the positive electrode and the negative electrode.

<Method for Manufacturing Energy Storage Device Electrode>

The method for manufacturing the electrode 10 is not particularly limited. For example, the electrode 10 can be manufactured by the following method. That is, the method for manufacturing the energy storage device electrode includes preparing the conductive electrode substrate including the main body and at least one plate-shaped tab and forming the insulating layer coating the surface and the side surface of the base end of the tab.

More specifically, for example, the electrode 10 can be obtained by steps 1 to 3.

(Step 1) The electrode mixture layer is laminated on the sheet-shaped electrode substrate.

(Step 2) The electrode substrate on which the electrode mixture layer is laminated is cut into a shape having the main body and at least one plate-shaped tab.

(Step 3) After cutting, the insulating layer is laminated on the electrode mixture layer non-forming portion in the main body and the base end in the tab.

Alternatively, the electrode substrate may previously be cut into the shape having the main body and the at least one plate-shaped tab, and the electrode mixture layer may be laminated on the electrode substrate. That is, the order of steps 1 and 2 may be reversed. After step 1, the insulating layer may be laminated on the electrode mixture layer non-forming portion (step 3), and may be cut into the shape having the main body and the at least one plate-shaped tab (step 2). In this case, after the insulating layer laminated on the electrode mixture layer non-forming portion is cut into a shape having the tab, the insulating layer may be laminated again on the side surface of the tab.

The electrode mixture layer in step 1 is laminated by applying the electrode mixture into a belt shape on both sides of the sheet-shaped electrode substrate. The electrode mixture is usually a paste containing an active material, a component such as a binder, and a dispersion medium. The electrode mixture layer is formed by drying after the application of the electrode mixture. The electrode mixture layer may be formed by dry coating. The term "dry coating" is a coating method in which a solvent is not used, and is also referred to as powder coating. Examples of the dry coating include electrostatic coating and a fluid immersion method.

The cutting of the electrode substrate in step 2 can be performed by a publicly known method such as laser or punching. The tab is formed in the electrode mixture layer non-forming portion in a sheet-shaped electrode substrate.

There is no particular limitation on the insulating layer lamination method in step 3, but a publicly known method such as coating can be adopted. The coating is performed while the electrode mixture layer and the leading end in the tab are masked. Consequently, the insulating layer can be coated on the electrode mixture layer non-forming portion in the main body and the base end in the tab. At this point, the insulating layer is also formed on the side surface (end face) of the electrode mixture layer non-forming portion in the main body and the side surface of the base end in the tab.

The insulating layer may be coated in step 3 by wet coating or dry coating. Preferably the insulating layer is coated in step 3 by dry coating. For example, a powder coating containing the insulating particle and the binder is applied, and the insulating layer is formed by heating the powder coating up to around a melting temperature of the binder. By forming the insulating layer by coating, particularly dry coating, the insulating layer formed on the side surface of the tab or the like tends to be thicker than the insulating layer formed on the surface. The film thickness can easily be controlled, and the highly uniform insulating film can efficiently be formed. Examples of the dry coating (powder coating) methods include an electrostatic coating method and a fluid immersion method. Among the dry coating methods, the electrostatic coating is preferably used. A highly uniform insulating film can efficiently be formed by the electrostatic coating method.

<Energy Storage Device>

Figure 4:
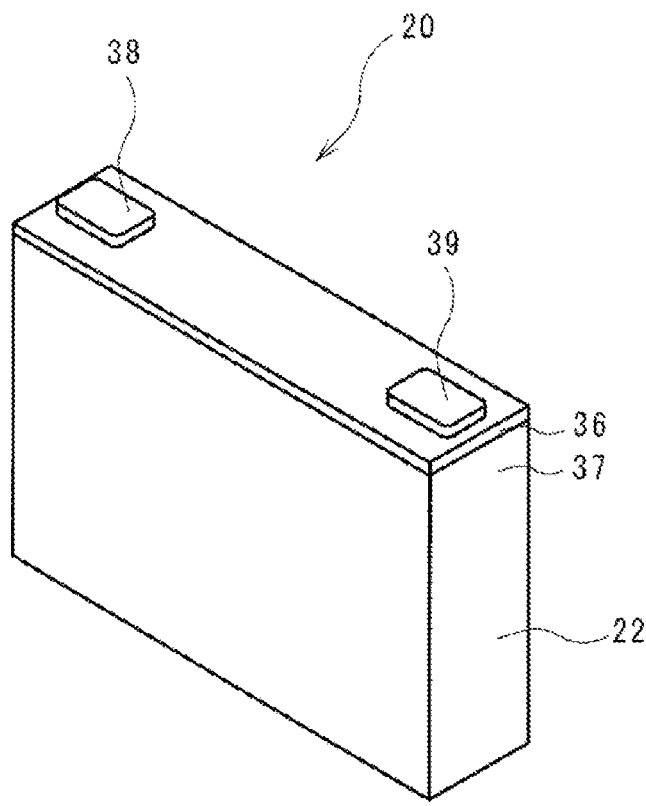
FIG. 4 is a perspective view illustrating a nonaqueous electrolyte secondary battery according to an embodiment of an energy storage device of the present invention.

FIG. 4 is a schematic diagram illustrating a rectangular nonaqueous electrolyte secondary battery 20 according to an embodiment of the energy storage device of the present invention. In the nonaqueous electrolyte secondary battery 20, an electrode assembly 21 (not illustrated in FIG. 4) in FIG. 5 is accommodated in a casing 22.

Figure 5:
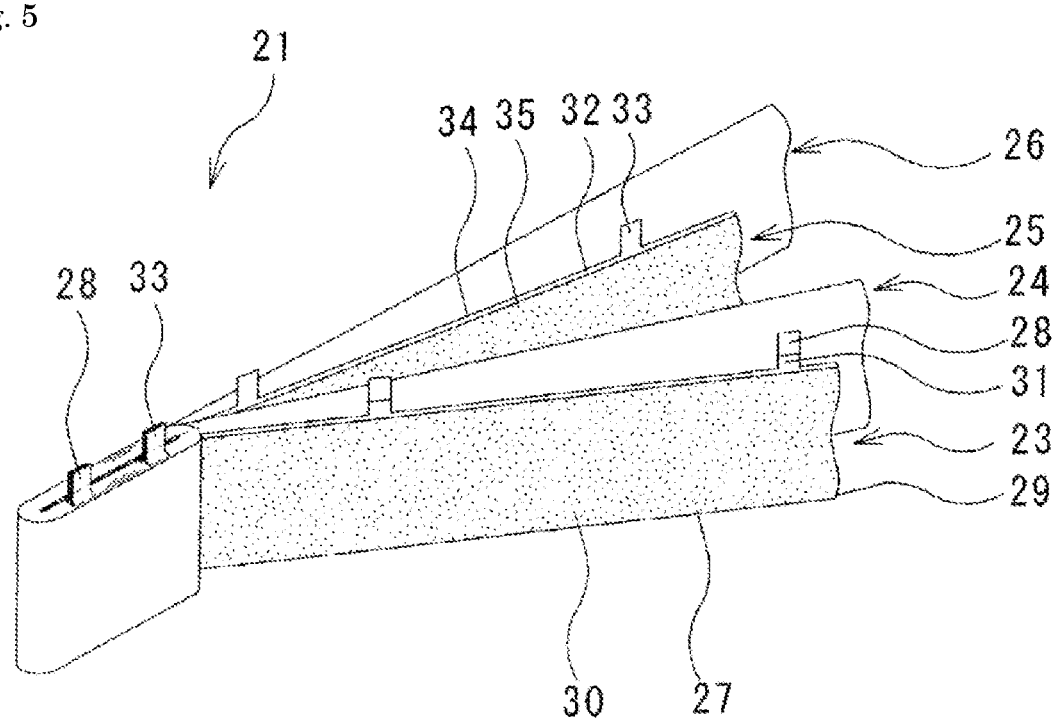
FIG. 5 is a schematic diagram illustrating an electrode assembly included in the nonaqueous electrolyte secondary battery in FIG. 4.

As illustrated in FIG. 5, in the electrode assembly 21, a positive electrode 23, a first separator 24, a negative electrode 25, and a second separator 26, all of which have a long strip shape with a constant width, are overlapped and wound into a flat shape. The electrode assembly 21 is accommodated in the casing 22 in the wound state.

The electrode 10 in FIGS. 1 to 3 can be used as the positive electrode 23. That is, the positive electrode 23 includes an electrode substrate 29 including a main body 27 and a tab 28, an electrode mixture layer 30 coating most of both surfaces of the main body 27 into a belt shape, and an insulating layer 31 coating the electrode mixture layer non-forming portion of the main body 27 and the base end of the tab 28. The detailed structure of the positive electrode 23 is as described above as the electrode 10.

The negative electrode 25 includes an electrode substrate 34 including a main body 32 and a tab 33, and an electrode mixture layer 35 coating most of the main body 32 into the belt shape. In the negative electrode 25, the insulating layer may be formed, or not be formed. In the negative electrode 25, the insulating layer may be formed only on the front and back surfaces such that the side surface of the tab 33 is exposed.

The first separator 24 and the second separator 26 are not particularly limited, but a publicly known energy storage device separator can be used. Examples of the material for the separator include a woven fabric, a nonwoven fabric, and a porous resin film. Among those, the porous resin film is preferably used. From the viewpoint of strength, polyolefins such as polyethylene and polypropylene are preferably used as a main component of the porous resin film. A porous resin film in which these resins and resin such as aramid and polyimide are compounded may be used. A separator in which an inorganic layer is laminated on the porous resin film can be used.

In the state in which the positive electrode 23, the first separator 24, the negative electrode 25, and the second separator 26 are wound, each of the plurality of tabs 28 of the positive electrode 23 and each of the plurality of tabs 33 of the negative electrode 25 protrude from the main bodies 27, 32 while overlapping each other. The plurality of tabs 28 and the plurality of tabs 33 in the laminated state are joined to the connecting member (also referred to as a current collecting member) by welding, and electrically connected to a positive electrode terminal 38 or a negative electrode terminal 39.

A publicly known aluminum casing, a publicly known stainless steel casing, a publicly known resin casing, and the like, which are usually used as the casing of the general nonaqueous electrolyte secondary battery, can be used as the casing 22. The casing 22 includes a lid 36 and a casing body 37. The positive electrode terminal 38 and the negative electrode terminal 39 are provided in the lid 36.

The casing 22 in which the electrode assembly 21 is accommodated is filled with the nonaqueous electrolyte. A publicly known nonaqueous electrolyte generally used for the nonaqueous electrolyte secondary battery can be used as the nonaqueous electrolyte. The nonaqueous electrolyte in which an electrolyte salt is dissolved in a nonaqueous solvent can be used.

Examples of the nonaqueous solvent include cyclic carbonates such as ethylene carbonate (EC), propylene carbonate (PC) and butylene carbonate (BC) and chain carbonates such as diethyl carbonate (DEC), dimethyl carbonate (DMC), and ethyl methyl carbonate (EMC).

Examples of the electrolyte salt include lithium salt, sodium salt, potassium salt, magnesium salt, and onium salt, and lithium salt is preferably used. Examples of the lithium salt include inorganic lithium salts such as $LiPF_6$, $LiPO_2F_2$, $LiBF_4$, $LiClO_4$ and $LiN(SO_2F)_2$ and lithium salts, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$, which have a fluorinated hydrocarbon group.

A normal temperature molten salt, an ionic liquid, a polymer solid electrolyte, or the like can be used as the nonaqueous electrolyte.

Other Embodiments

The present invention is not limited to the above embodiment, but various changes and modifications can be made in addition to the above embodiment. For example, the structure in which the electrode mixture layer is directly laminated on the surface of the main body of the electrode substrate is adopted in the electrode 10 of FIG. 1. Alternatively, an intermediate layer may be provided between the electrode substrate and the electrode mixture layer. For example, the intermediate layer can be formed by a composition containing a resin binder and a conductive particle. In the case that the electrode includes the intermediate layer, the "average height from the surface of the main body to the surface of the electrode mixture layer" is an average thickness of a two-layer structure constructed with the intermediate layer and the electrode mixture layer.

In the energy storage device (nonaqueous electrolyte secondary battery) of FIGS. 4 and 5, the electrode 10 according to the embodiment of the present invention is used as the positive electrode. Alternatively, the electrode 10 may be used as the negative electrode. The electrode 10 has the structure in which both the side surfaces in the base end of the tab are coated with the insulating layer. Alternatively, only one side surface may be coated with the insulating layer. Even in such a case, superior electrical contact prevention function as compared with that of the conventional electrode in which the side surface of the tab is not coated at all can be exhibited.

In the energy storage device of the embodiment, the electrode assembly is formed while the positive electrode, the negative electrode and the separator are wound. Alternatively, the electrode assembly may be formed by alternately laminating the plurality of positive electrodes and the plurality of negative electrodes with the separator interposed therebetween. In the embodiment, the description has been made by exemplifying a case in which the energy storage device is the nonaqueous electrolyte secondary battery, but other energy storage devices may be used. A capacitor (an electric double layer capacitor, a lithium ion capacitor, and a primary battery) can be cited as an example of other energy storage devices. The energy storage device in which the electrolyte is an aqueous solution may be used. In any energy storage device, the electrical contact between the tab of one of the electrodes and the other electrode due to the generation of the lamination deviation can be prevented using the energy storage device electrode of the present invention as at least one of the positive electrode and the negative electrode.

Figure 6:
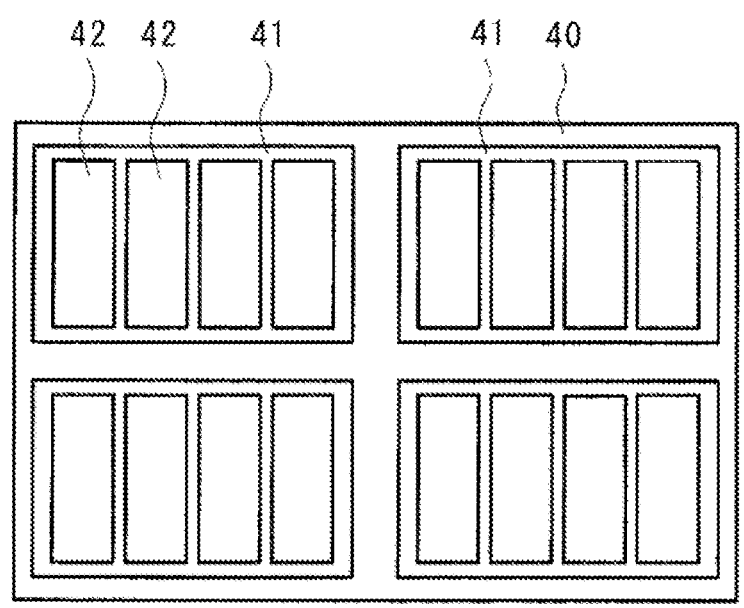
FIG. 6 is a schematic diagram illustrating an energy storage apparatus constructed by collecting a plurality of energy storage devices according to the embodiment of the present invention.

The structure of the energy storage device of the present invention is not particularly limited. For example, a cylindrical battery, a prismatic battery (rectangular battery), and a flat battery can be cited. The present invention can also be implemented as an energy storage apparatus including the plurality of energy storage devices. FIG. 6 illustrates an embodiment of the energy storage apparatus. In FIG. 6, an energy storage apparatus 40 includes a plurality of power storage units 41. Each power storage unit 41 includes a plurality of energy storage devices 42 (for example, the nonaqueous electrolyte secondary battery 20 in FIG. 4). The energy storage apparatus 40 can be mounted as a vehicle power source for an electric vehicle (EV), a hybrid electric vehicle (HEV), and a plug-in hybrid electric vehicle (PHEV).

INDUSTRIAL APPLICABILITY

The present invention can be applied to electronic devices such as a personal computer and a communication terminal, an energy storage device used as a vehicle power source, an energy storage device electrode including the energy storage device, and the like.

DESCRIPTION OF REFERENCE SIGNS 10 electrode
11 electrode substrate
12 electrode mixture layer
13 Insulating layer
14 main body
15 tab
20 nonaqueous electrolyte secondary battery
21 electrode assembly
22 casing
23 positive electrode
24 first separator
25 negative electrode
26 second separator
27 main body
28 tab
29 electrode substrate
30 electrode mixture layer
31 Insulating layer
32 main body
33 tab
34 electrode
35 electrode mixture layer
36 lid
37 casing body
38 positive electrode terminal
39 negative electrode terminal
40 energy storage apparatus
41 power storage unit
42 energy storage device

The invention claimed is:

1. An energy storage device electrode comprising:
   a conductive electrode substrate including a main body and at least one plate-shaped tab; and
   an insulating layer coating a surface and a side surface of a base end of the tab,
   wherein the insulating layer contains an insulating particle and a binder.

2. The energy storage device electrode according to claim 1, wherein an average thickness of the insulating layer coating the side surface of the tab is larger than an average thickness of the insulating layer coating the surface of the tab.

3. The energy storage device electrode according to claim 1, further comprising an electrode mixture layer laminated on a surface of the main body,
   wherein the average thickness of the insulating layer coating the surface of the tab is less than or equal to an average height from the surface of the main body to a surface of the electrode mixture layer.

4. The energy storage device electrode according to claim 1, wherein the energy storage device electrode is a positive electrode.

5. An energy storage device comprising the energy storage device electrode according to claim 1.

6. A method for manufacturing an energy storage device electrode, the method comprising:
   preparing a conductive electrode substrate including a main body and at least one plate-shaped tab; and
   forming an insulating layer coating a surface and a side surface of a base end of the tab,
   wherein the insulating layer contains an insulating particle and a binder.

7. The method according to claim 6, wherein the insulating layer is formed by dry coating.

8. The energy storage device electrode according to claim 1, wherein the main body comprises:
   an electrode mixture layer forming portion in which an electrode mixture layer is laminated; and
   an electrode mixture layer non-forming portion in which the electrode mixture layer is not laminated, and
   the insulating layer is laminated on at least the electrode mixture layer non-forming portion.

9. The method according to claim 6, wherein the main body comprises:
   an electrode mixture layer forming portion in which an electrode mixture layer is laminated; and
   an electrode mixture layer non-forming portion in which the electrode mixture layer is not laminated, and
   the insulating layer is laminated on at least the electrode mixture layer non-forming portion.

10. The energy storage device electrode according to claim 8, wherein the electrode mixture layer non-forming portion includes an end face on a side of the tab, and the insulating layer further coats the end face of the electrode mixture layer non-forming portion.

11. The method according to claim 9, wherein the electrode mixture layer non-forming portion includes an end face on a side of the tab, and the insulating layer further coats the end face of the electrode mixture layer non-forming portion.

12. An energy storage device comprising an electrode assembly in which each of a plurality of positive electrodes and each of a plurality of negative electrodes are alternately laminated with a separator interposed therebetween, wherein each of the plurality of positive electrodes is the energy storage device electrode according to claim 1, and the electrode substrate of each of the plurality of positive electrodes includes the main body and one said plate-shaped tab.

13. An energy storage device comprising an electrode assembly in which a positive electrode, a negative electrode and a separator are wound, wherein
the positive electrode is the energy storage device electrode according to claim 1, and
the electrode substrate of the positive electrode includes the main body and a plurality of said plate-shaped tabs.

14. The energy storage device according to claim 5, further comprising:
a casing in which the energy storage device electrode is accommodated;
a terminal provided on the casing; and
a connecting member connected to the terminal, wherein
the tab is joined to the connecting member and electrically connected to the terminal.

\* \* \* \* \*